US012688334B2

(12) United States Patent
Chen et al.

(10) Patent No.: US 12,688,334 B2
(45) Date of Patent: Jul. 21, 2026

(54) APPLICATION INTEGRITY VERIFICATION BY SDK

(71) Applicant: Visa International Service Association, San Francisco, CA (US)

(72) Inventors: Yuexi Chen, Foster City, CA (US); John Markh, Ontario (CA)

(73) Assignee: Visa International Service Association, San Francisco, CA (US)

( * ) Notice: Subject to any disclaimer, the term of this patent is extended or adjusted under 35 U.S.C. 154(b) by 25 days.

(21) Appl. No.: 18/838,055

(22) PCT Filed: Feb. 14, 2022

(86) PCT No.: PCT/US2022/016358
§ 371 (c)(1),
(2) Date: Aug. 13, 2024

(87) PCT Pub. No.: WO2023/154066
PCT Pub. Date: Aug. 17, 2023

(65) Prior Publication Data
US 2025/0148131 A1 May 8, 2025

(51) Int. Cl.
*G06F 21/60* (2013.01)
*G06F 21/51* (2013.01)
*G06F 21/64* (2013.01)

(52) U.S. Cl.
CPC .............. *G06F 21/64* (2013.01); *G06F 21/51* (2013.01); *G06F 21/602* (2013.01)

(58) Field of Classification Search
CPC ........ G06F 21/64; G06F 21/51; G06F 21/602; G06F 21/14; G06F 21/57
See application file for complete search history.

(56) References Cited

U.S. PATENT DOCUMENTS 10,719,373 B1 * 7/2020 Koponen ................ G06F 21/64
10,785,287 B2 9/2020 Prakash et al.
11,003,757 B1 5/2021 Cheng
(Continued)

FOREIGN PATENT DOCUMENTS

CN 111950035 A 11/2020
KR 20170136406 A 12/2017
(Continued)

OTHER PUBLICATIONS

EP22926283.7 , "Extended European Search Report", Mar. 11, 2025, 8 pages.
(Continued)

*Primary Examiner* — Khoi V Le

(74) *Attorney, Agent, or Firm* — Kilpatrick Townsend & Stockton LLP

(57) ABSTRACT

A method is disclosed and includes executing an integrated application comprising an SDK (software development kit) on a user device with a processor. The method includes determining, by the SDK and the processor on the user device, an checksum for the integrated application, validating, by the SDK in the user device, the integrated application using the determined checksum, and responsive to validating the determined checksum, performing, by the integrated application on the user device, an action.

19 Claims, 6 Drawing Sheets

(56) References Cited

U.S. PATENT DOCUMENTS

| | | | |
|---|---|---|---|
| 2008/0276096 A1* | 11/2008 | Aho | G06F 21/64 |
| | | | 713/180 |
| 2016/0182543 A1* | 6/2016 | Aabye | G06F 21/88 |
| | | | 726/5 |
| 2019/0166123 A1 | 5/2019 | Han et al. | |
| 2020/0169620 A1* | 5/2020 | Vlachogiannis | H04L 41/5012 |
| 2021/0250185 A1 | 8/2021 | Bhattacharya | |

FOREIGN PATENT DOCUMENTS

| KR | 102078347 B1 | 2/2020 |
|---|---|---|
| KR | 102269085 B1 | 6/2021 |

OTHER PUBLICATIONS

PCT/US2022/016358 , "International Search Report and Written Opinion", Nov. 2, 2022, 10 pages.

* cited by examiner

APPLICATION INTEGRITY VERIFICATION BY SDK

CROSS-REFERENCES TO RELATED APPLICATIONS

This application is a National Stage of PCT Application No. PCT/US2022/016358, filed Feb. 14, 2022, which is herein incorporated by reference in its entirety.

BACKGROUND

Mobile applications (e.g., acceptance applications, mobile wallet applications, media access applications, etc.) allow users to perform actions such as making payments, accessing secure data, and accessing secure content. However, actions such as these can involve the use of sensitive information, and there is a need to ensure that the applications are not altered by tampering. Currently, an application integrity verification process for a mobile application can only be performed by developer of the mobile application.

Since there can be hundreds or thousands of mobile applications that perform the same or similar functions, SDKs or software development kits, can be used to efficiently implement those functions. For instance, an example SDK can be used to implement a commonly used function such as a biometric security function. Biometric security could be used in banking applications, streaming video applications, e-mail applications, etc. The SDK can be developed by one entity, which may have some expertise in creating software for a particular function, while the final mobile applications incorporating the SDK can be developed by other entities.

Although the SDK development approach is generally acceptable, the SDK is developed before the final mobile application which integrates the SDK is developed. As a result, the developer of the SDK has no way of ensuring that the SDK is secure in the final mobile application. Some mobile application developers may create very secure applications, while others may not. In the latter case, the SDK may be more vulnerable to tampering. The developer of the SDK would like to have assurance that the SDK that it developed is not being compromised when in use in final mobile applications.

Embodiments of the disclosure address this problem and other problems individually and collectively.

SUMMARY

Embodiments of the invention can include systems, methods, and devices to ensure the integrity of applications that can incorporate an SDK.

One embodiment includes a method including: executing an integrated application comprising an SDK (software development kit) on a user device; determining, by the SDK and the processor on the user device, an checksum for the integrated application; validating, by the SDK in the user device, the integrated application using the determined checksum; and responsive to validating the determined checksum, performing, by the integrated application on the user device, an action.

Another embodiment includes a user device comprising: a processor; and a computer readable medium, comprising code for executing operations including: executing an integrated application comprising an SDK (software development kit) on the user device; determining, by the SDK and the processor on the user device, an checksum for the integrated application; validating, by the SDK in the user device, the integrated application using the determined checksum; and responsive to validating the determined checksum, performing, by the integrated application on the user device, an action.

Another embodiment includes a method comprising: storing, by a secure server computer, an original checksum for an integrated application comprising an SDK; receiving, by the secure server computer from a user device, an application identifier for the integrated application comprising the SDK, the integrated application comprising the SDK being on the user device; and transmitting, by the secure server computer, the original checksum to the user device, or determining that the original checksum matches a checksum determined by the user device.

A better understanding of the nature and advantages of embodiments of the invention may be gained with reference to the following detailed description and accompanying drawings.

DETAILED DESCRIPTION

Figure 1:
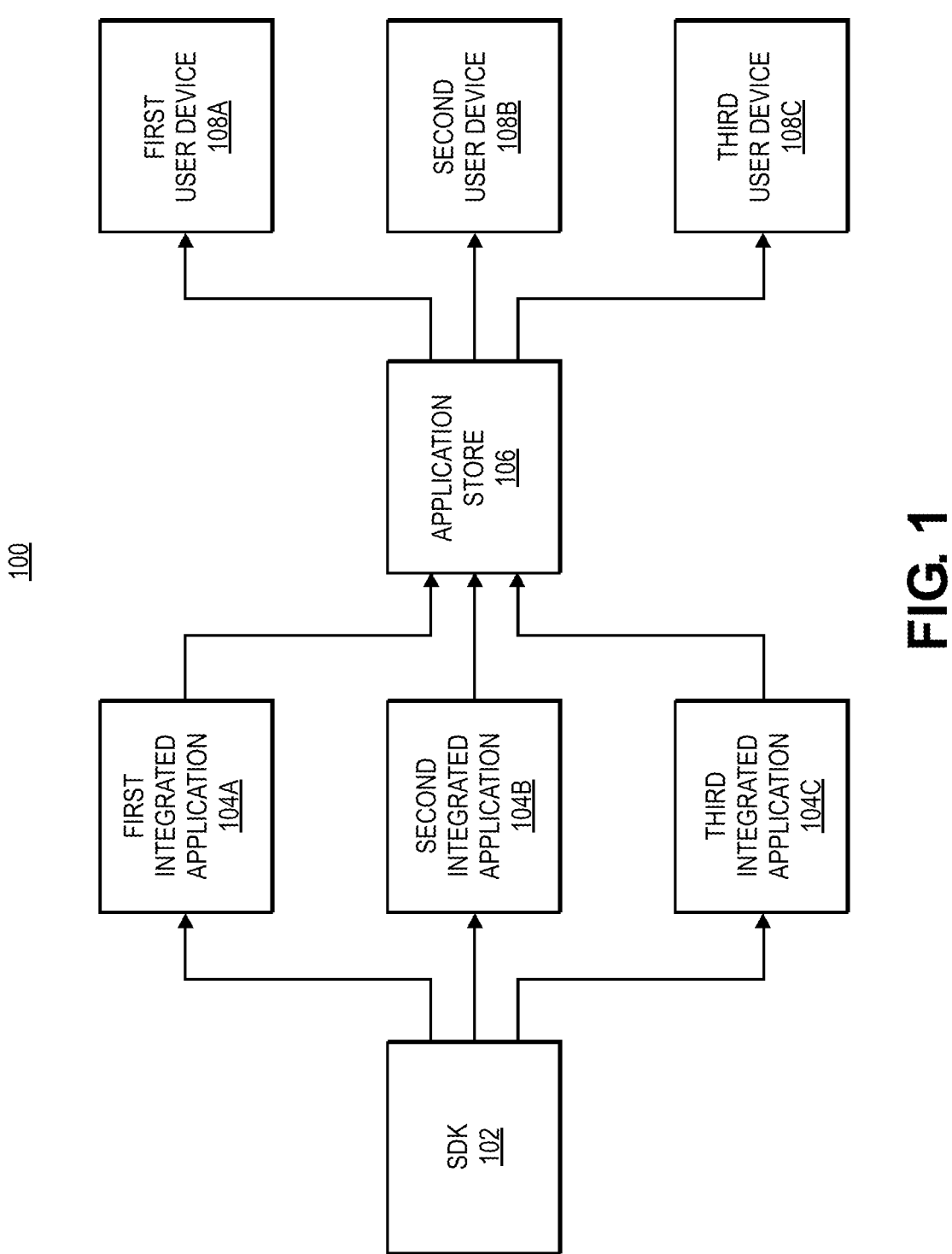
FIG. 1 shows diagram illustrating a process of incorporating an SDK into integrated applications, and then integrating integrated applications into user devices.

Prior to discussing embodiments of the disclosure, some terms can be described in further detail.

A "SDK" or may be a software development kit can be a collection of software development tools that can be present in an installable package that allows any applications that download the kit to enable the functions written in the kit. The functions present in an SDK may vary. For example, one SDK may have fingerprint recognition software. Another SDK may have token processing software.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may include be any type of wearable technology devices such as smart watches, smart glasses, smart earpieces, etc. The user device may also include one or more processors capable of processing user input. Further, the user device may also include one or more input sensors for receiving user input. Examples of input sensors include accelerometers, cameras, microphones, etc. The user device may also provide remote communication capabilities with external a networks. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a depiction of how a typical SDK 102 might be incorporated into an integrated application, and eventually into a user device. The SDK 102 may be built by a first software developer, and the SDK 102 may then be provided to a number of different second software developers that may develop different end applications using the SDK 102. The different end applications may include a first integrated application 104A, a second integrated application 104B, and a third integrated application 104C. As an example, SDK 102 could include biometric authentication software. The SDK 102 including the biometric authentication software could be incorporated into different applications such as a banking application, a home security application, and a streaming service application.

These integrated applications would have access to functions and features built in the SDK 102. Once the integrated applications 104A, 104B, 104C are formed, they can be published in an application store 106. Different user devices such as a first user device 108A, a second user device 108B, and a third user device 108C can download and install one or more of the integrated applications 104A, 104B, 104C from the application store 106.

In some instances, the entity that develops the SDK 102 may wish to verify or ensure that the end applications (e.g., the integrated applications 104A, 104B, 104C) comply with certain requirements such as security requirements. For example, the SDK 102 could include biometric authentication software. The entity that develops the SDK 102 may wish to ensure that the end applications such as the integrated applications 104A, 104B, 104C are secure and that the any software that is installed in them does not affect the SDK 102 with the biometric authentication software. For example, the first integrated application 104A that incorporates the SDK 104 may have a security vulnerability that could allow an unauthorized party to alter the result of the biometric authentication software in the SDK 102. The developer of the SDK 102 can ensure that the SDK 102 is secure when it is provided to the developer of the first integrated application 104A. However, the developer of the SDK 102 cannot verify the reliability or the security of the first integrated application 104A, since the developer of the SDK 102 does not have control over the final development of the first integrated application 104A.

Embodiments of the invention can address this problem and other problems.

Figure 2:
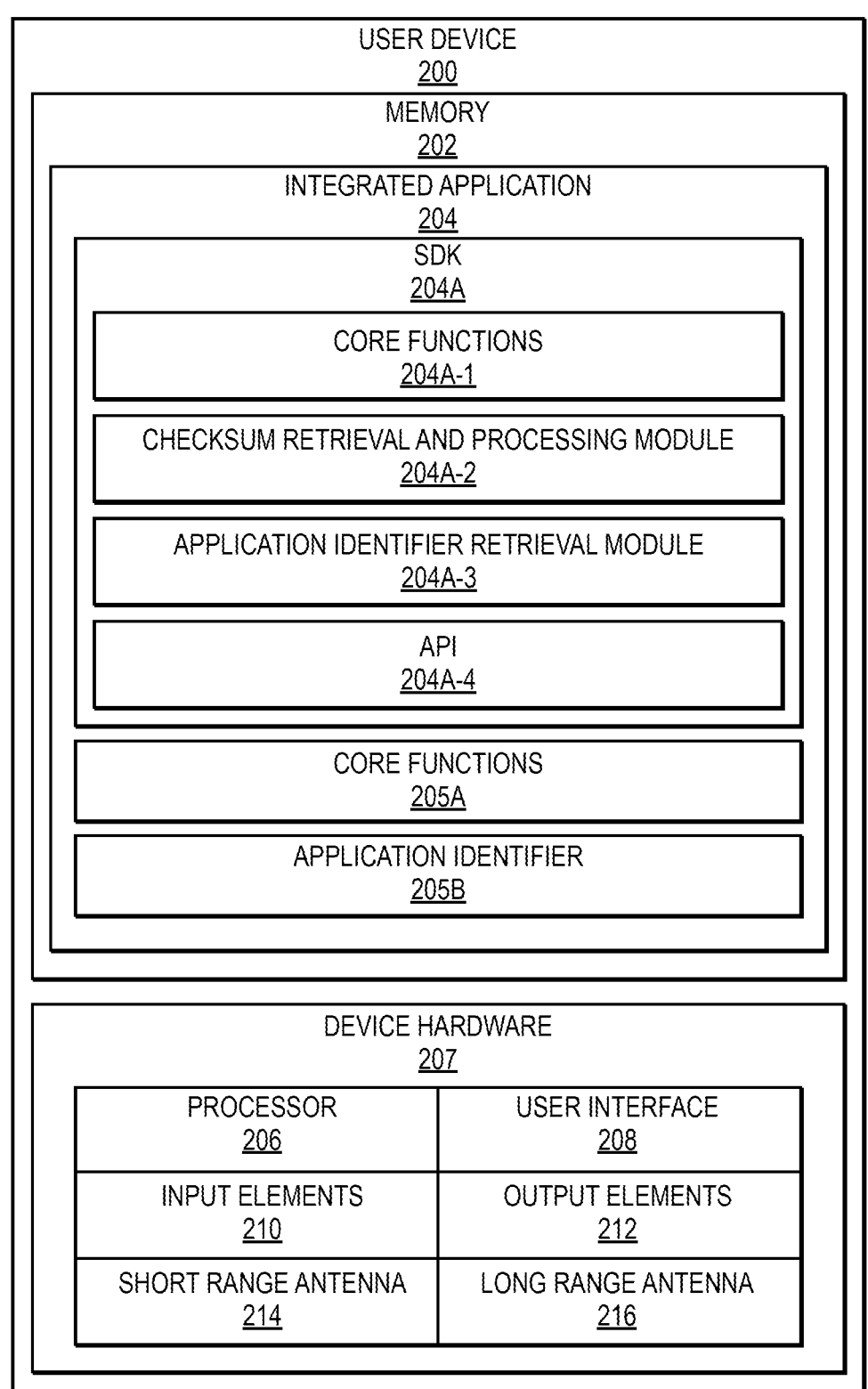
FIG. 2 shows a block diagram of a user device according to an embodiment.

FIG. 2 illustrates a block diagram of a user device 200 according to an embodiment. The user device 200 can include a memory 202 comprising an integrated application 204 with an SDK 204A. The user device 200 may also include device hardware 207 coupled to a memory 202.

Device hardware 207 may include a processor 206, a short-range antenna 214, a long-range antenna 216, input elements 210, a user interface 208, and output elements 212 (which may be part of the user interface 208). Examples of input elements may include microphones, keypads, touch-screens, sensors, etc. Examples of output elements may include speakers, display screens, and tactile devices. The processor 206 can be implemented as one or more integrated circuits (e.g., one or more single core or multicore micro-processors and/or microcontrollers) and is used to control the operation of the user device 200. The processor 206 can execute a variety of programs in response to program code or computer-readable code stored in the memory 202 and can maintain multiple concurrently executing programs or processes.

The long-range antenna 216 may include one or more RF transceivers and/or connectors that can be used by the user device 200 to communicate with other devices and/or to connect with external networks. The user interface 208 can include any combination of input and output elements to allow a user to interact with and invoke the functionalities of the user device 200. The short-range antenna 214 may be configured to communicate with external entities through a short-range communication medium (e.g. using Bluetooth, Wi-Fi, infrared, NFC, etc.). The long-range antenna 216 may be configured to communicate with a remote base station and a remote cellular or data network, over the air.

The memory 202 can be implemented using any combination of any number of non-volatile memories (e.g., flash memory) and volatile memories (e.g. DRAM, SRAM), or any other non-transitory storage medium, or a combination thereof media. The memory 202 may store computer code, executable by the processor 206, for performing any of the functions described herein. For example, the memory 202 may comprise a computer readable medium comprising code, executable by the processor 206, for implementing a method comprising: executing an integrated application comprising an SDK (software development kit) on the user device; determining, by the SDK and the processor on the user device, an checksum for the integrated application; validating, by the SDK in the user device, the integrated application using the determined checksum; and responsive to validating the determined checksum, performing, by the integrated application on the user device, an action.

The memory 202 may also store an integrated application 204, which contains a, SDK 204A, core functions 205A, and an application identifier 205B.

The core functions 205A of the integrated application may include code, executable by the processor 206 for performing suitable functions that can be performed by the integrated application 204. The core functions 205A may be programmed by an entity other than the entity that provided the SDK 204A. The integrated application 204 may be an application with SDK 204A integrated into the application.

For example, if the integrated application 204 is a banking application, then the core functions 205A may comprise software or code for of performing a banking transaction, displaying an account balance, account management, checking different credit cards stored into an account, etc. If the integrated application 204 is a video streaming application, then the core functions may include software or code for playing videos, recommending videos to watch, account management, etc.

The integrated application 204 may have an application identifier 205B, where the application identifier can be used to identify the integrated application 204. In some embodiments, the application identifier 205B can take the form of any suitable combination of alphameric characters.

The SDK 204A may include core functions 204A-1, a checksum retrieval and processing module 204A-2, an application identifier retrieval module 204A-3, and an API 204A-4.

The core functions 204A-1 may have been programmed or created by an entity that develops the SDK 204A, and not the entity that created the final integrated application 204. For example, core functions 204A-1 in the SDK 204A may comprise of security functions that are used by an integrated application 204. Exemplary security functions include authentication functions, encryption functions, tokenization functions, secret (e.g., password) management functions, account access functions, etc. The core functions 204A-1 may also include other functions that may not be primary focused on security. Examples of such functions may include reward functions, alert functions, account management functions, etc.

The checksum retrieval and processing module 204A-2 may comprise code, executable by the processor 206, to determine an application checksum of the integrated application 204, e.g., during runtime. In some embodiments, the checksum retrieval and processing module 204A-2 and the processor 206 may retrieve an original checksum from an external server computer. In embodiments of the invention, the application checksum process can be used to check for errors or alterations in the final integrated application 204. In one example, the code making up a final integrated application 204 including the SDK 204A could be hashed when it is completed to form an original first hash value (an example of an original checksum value). When the final integrated application is run on a user's user device 200, the final integrated application can be hashed again in the same manner as before to determine a second hash value. The original first hash value and the determined second hash value can be compared to determine if the final integrated application has or has not been altered or contains errors.

The application checksum in runtime may be generated using a checksum process including, but not limited to, Adler-32, Fletcher checksum, Luhn algorithm, MD5, SHA-1, SHA-256, and SHA-512.

The checksum retrieval and processing module 204A-2 may, in conjunction with the processor 206, also receive an original checksum stored in the database 306 of the secure server computer 300 using the API 204A-4, which interfaces with the secure server computer 300 from which the original checksum is retrieved. In some embodiments, the checksum retrieval and processing module 204A-2 may, in conjunction with the processor 206, receive the original checksum from the secure server computer 300 by sending the application identifier 205B of the integrated application 204 to the secure server computer 300. The application identifier 205B of the integrated application 204 may be retrieved by the SDK 204A by using the application identifier retrieval module 204A-3. Once the application checksum that was determined during runtime and the original application checksum are obtained, the checksum retrieval and processing module 204A-2 may validate the integrated application 204A by comparing the checksums. The result of the comparison may determine whether the academic integrity verification is successful or not.

Figure 3:
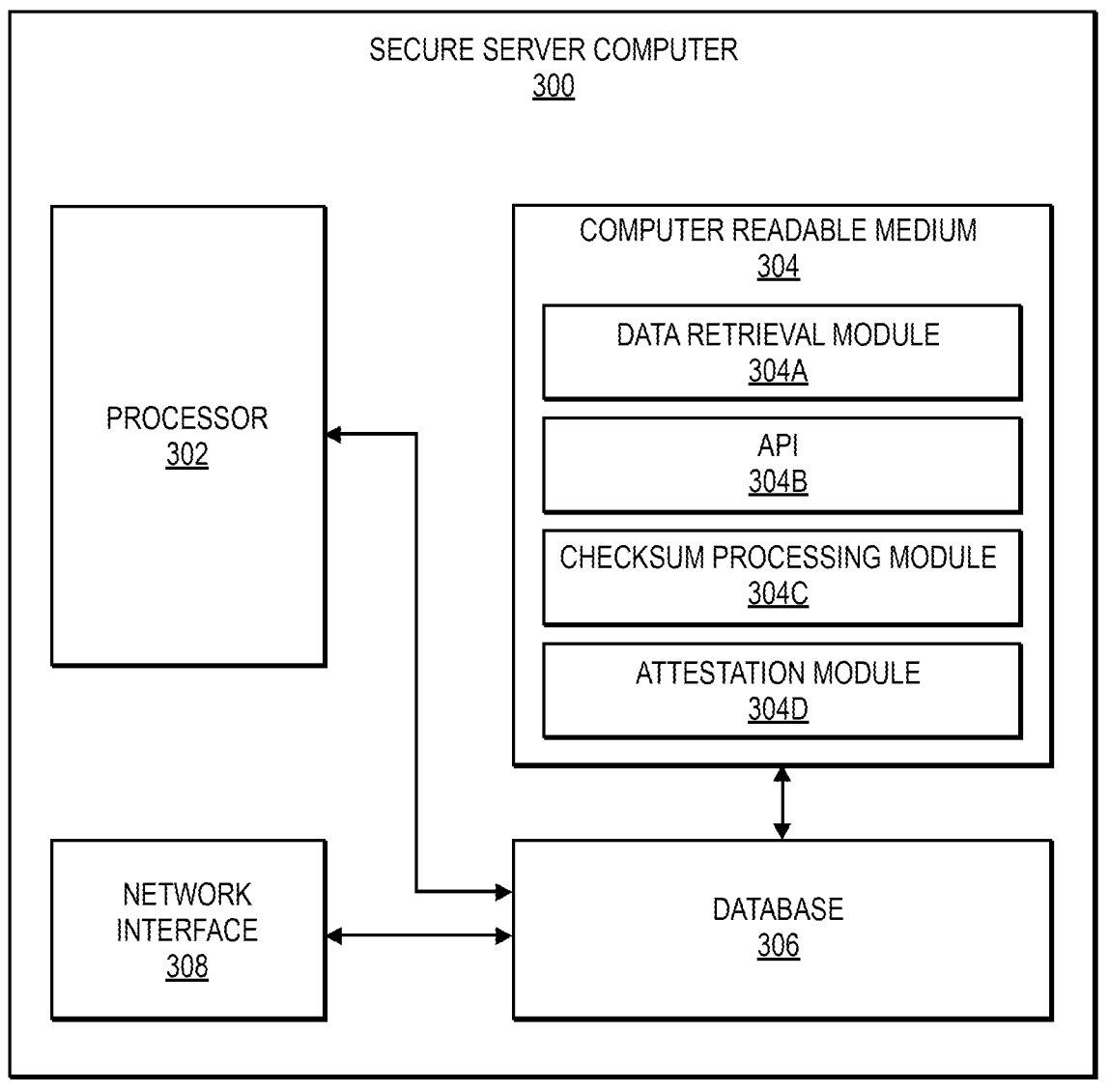
FIG. 3 shows a block diagram of a secure server computer according to an embodiment.

FIG. 3 shows a block diagram of a secure server computer 300 according to an embodiment. The secure server computer 300 may comprise a processor 302, which may be coupled to a computer readable medium 304, database 306, and a network interface 308. The database 306 may contain application data such as application identifiers and checksums of integrated applications. It may also store other data such as cryptographic keys (e.g., different encryption keys including symmetric keys, and/or asymmetric keys).

The network interface 308 may include an interface that can allow the secure server computer secure server computer 300 to communicate with external computers. The network interface 308 may enable the secure server computer 108 to communicate data to and from another device (e.g., service provider applications, token service providers, resource provider applications, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 308 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 308 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 304 may comprise software modules including a data retrieval module 304A, an API 304B, a checksum processing module 304C, and an attestation module 304D.

The data retrieval module 304A may comprise code that can cause the processor 302 to retrieve data, such as an original checksum of an application, from the database 306. In order to identify the correct checksum from the database, the data retrieval module 304A may (referring to FIG. 2) use an application identifier 205B of the integrated application 204 to locate the original checksum. The application identifier 205B for the integrated application 204 may be sent by the SDK 204A of the integrated application 204. The secure server computer 300 may receive the application identifier 205B from the integrated application 204 using the API 304B, which interfaces with the integrated application 200. By using the application identifier 205B, the secure server computer 300 may retrieve the original checksum of the integrated application 204 from the database 306. The obtained original checksum may be transmitted to the SDK 204A using the API 304B, wherein the user device 200 validates the integrated application 204 using the original checksum.

The checksum processing module 304C may comprise code that can obtain a determined application checksum from the SDK 204A during runtime. In some embodiments, the checksum processing module 304C may compare the original checksum retrieved by using the data retrieval module 304A with the determined checksum from the SDK 204A.

The attestation module 304D may comprise code that can use the result of the comparison from the checksum processing module 304C to generate a device attestation payload, in which the attestation module 304D (using the processor 302) signs the device some data (e.g., an original checksum and/or an application identifier) attestation payload using a private key stored in the database 306. The secure server computer 300 may transmit the attestation payload to the integrated application 204, and the SDK 204A may verify the attestation payload from the secure server computer 300 using a public key corresponding to the private key to validate the result.

Figure 4:
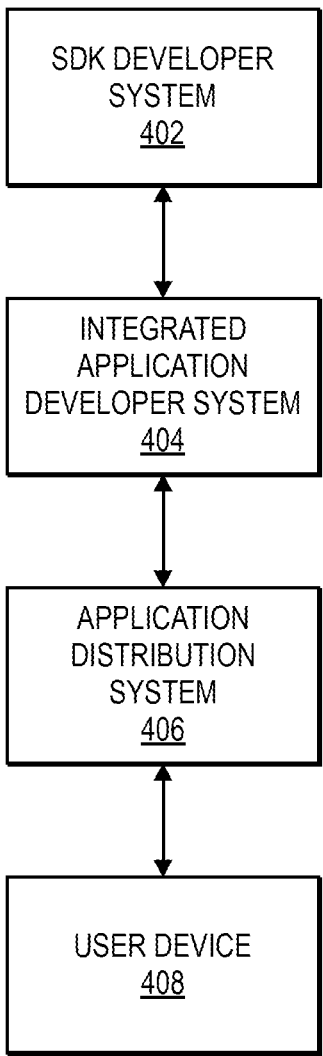
FIG. 4 shows a block diagram of a system according to an embodiment.

FIG. 4 shows a block diagram illustrating different systems (e.g., an SDK developer system 402, an integrated application developer system 404, and an application distribution system 406) used in the process of deploying an integrated application 204 with an SDK to a user device 408.

The SDK developer system 402 develops an SDK, which is provided to an integrated application developer system 404. The integrated developer system 404 integrates the SDK 204A in its an integrated application. The integrated application 204 is then sent to the application distribution system 406. A user may then use the user device 408 to can download the published integrated application 204 from the application distribution system 406.

The SDK developer system 402 may build an SDK 204A that can perform an application integrity verification process. The SDK 204A may contain a function that can retrieve an application checksum and identifier during runtime. The SDK 204A may also comprise a function that can retrieve an original checksum of the integrated application 204 from the secure server computer. The SDK 300 can compare the original checksum with the application checksum determined at runtime in an application integrity verification process. In some embodiment, the SDK 204A may comprise a function to check a device attestation received from the secure server computer 300.

Once the functions are built in the SDK 204A, the SDK 204A may go through several phases of final checks before it is made available to the integrated application developer system 404. For example, the SDK 204A may need to pass a functional certification and a security certification. Once these are completed, the SDK is approved and may be provided to the application developer system 404.

The application developer system 404 may be operated by an application developer such as a banking application developer, a streaming service application developer, a social media application developer, etc. Once the integrated application developer system 404 integrates the SDK into its application, the resulting integrated application 204 may be sent to the application distribution system 406.

The application distribution system 406 may be a platform that stores integrated applications so that they can be downloaded by user devices such as user device 408.

Figure 5:
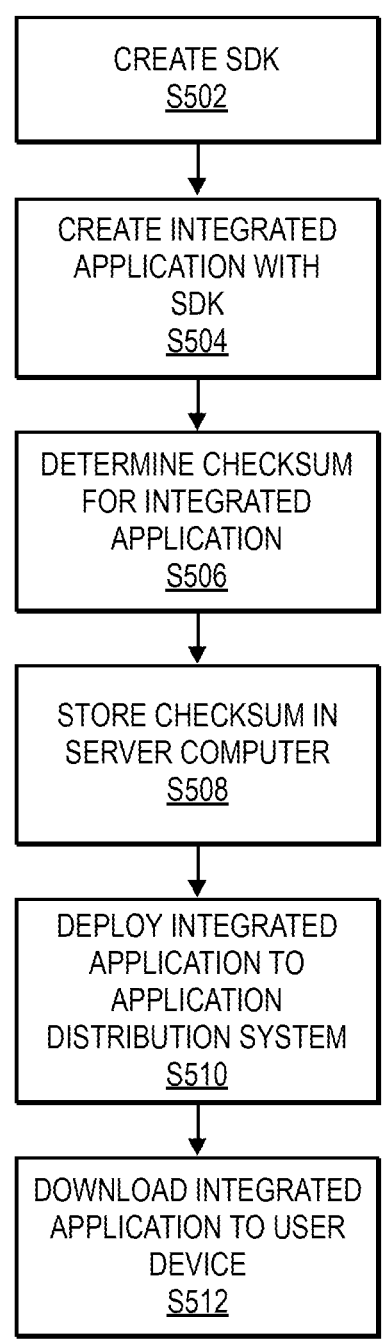
FIG. 5 shows a flowchart illustrating a process for providing an integrated application with an SDK to a user device.

FIG. 5 shows a flowchart illustrating a development of an integrated application with an SDK and its subsequent download to a user device.

In step S502, an SDK 204A is created by the SDK developer system 402. The SDK can include core functions and code for perform application integrity verification. In some embodiments, the SDK developer system 402 may implement code that determines an application checksum of an integrated application and an application identifier of the integrated application during runtime. For example, when the integrated application 204 executes a payment transaction, the SDK may execute the code for determining an application checksum for the integrated application, and for obtaining an application identifier for the integrated application when the integrated application 204 is run. The SDK developer system 402 may also implement code to connect to retrieve an original checksum from a remote server computer. The SDK developer system 402 may also implement the code to compare the determined application checksum with the original application checksum to validate the integrated application 204. In some embodiments, a function to verify a device attestation from the secure server computer may be implemented. Once these functions are implemented within the SDK, the SDK developer system 402 provides the SDK to an integrated application developer system 404.

The SDK 204A may comprise other core functions and features besides application integrity verification. One core function may comprise of authentication functions to authenticate a user. Another core function may comprise of tokenization functions to tokenize the credential information.

In step S504, the integrated application developer system 404 integrates the SDK into the application to create an integrated application 204.

In step S506, the original checksum for the integrated application 204 may be determined by the integrated application developer system 404. The original checksum of the integrated application 204 may be generated using a checksum process such as by hashing the integrated application using a hashing algorithm. The original checksum may be used to determine if the integrated application has been altered.

In step S508, the integrated application developer system 404 stores the original checksum of the integrated application 204 in the secure server computer 300. The integrated application developer system 404 associates the original checksum with the application identifier of the integrated application 204 and stores this information.

In step S510, once the original checksum and the integrated application identifier are stored in the secure server computer 300, the integrated application 204 is deployed to the application distribution system 406.

In step S512, once the integrated application 204 is deployed to the application distribution system 406, the integrated application 204 may be downloaded by the user device 408.

Figure 6:
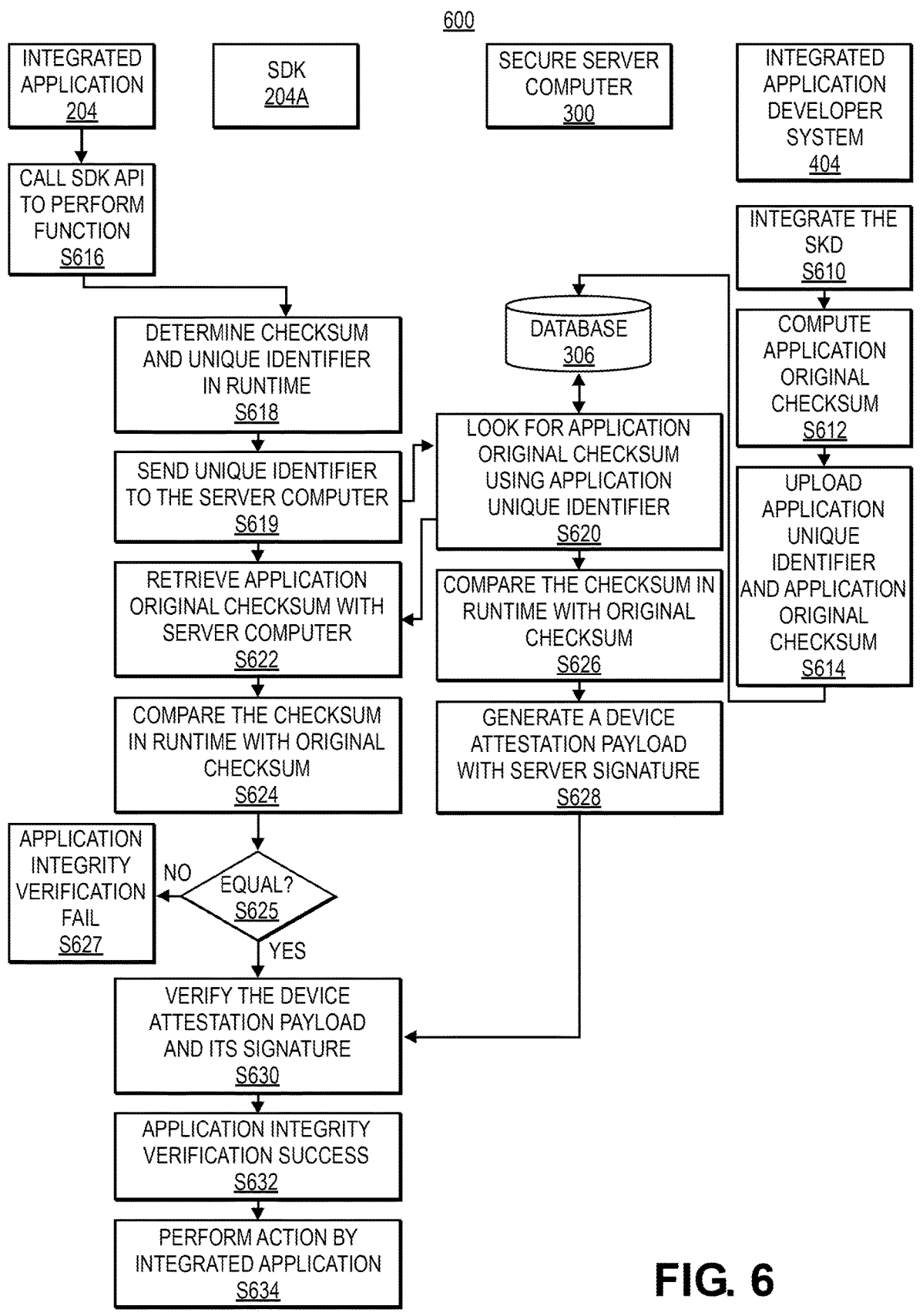
FIG. 6 shows a flow diagram illustrating a process for performing an integrated application verification process according to an embodiment.

FIG. 6 shows a block diagram of a system according to an embodiment with a flow diagram illustrating SDK 204A performing an application integrity verification process. An integrated application 204, SDK 204A, secure server computer 300, and integrated application developer system 404 communicate with each other to retrieve checksums and perform an application integrity verification with respect to the integrated application 204. After successful verifying the integrity of the integrated application, an action can be performed by the integrated application 204. Exemplary actions include conducting a payment transaction, accessing sensitive data, performing data transfers, etc.

In step S610, the integrated application developer system 404 integrates the SDK 204A into its application to create an integrated application 204A. This step is similar to the step S504 above.

In step S612, once the SDK 204A is integrated with the application, the integrated application developer system 404 computes an application original checksum. This step is similar to the step S506 above.

In step S614, once the original checksum is computed by the integrated application developer system 404, the database 306 of the secure server computer 300 receives the original checksum of the integrated application 204. The original checksum may be stored along with the application identifier 205B. When the SDK 204A needs to retrieve the original checksum of the integrated application 204, the SDK 204A may send the application identifier 204B to the secure server computer 300. The secure server computer 300 can identify the matching original checksum using the application identifier 204B and send the original checksum to the SDK 204A. The integrated application 204 may be deployed to the application distribution system 406 after storing the original checksum in the database 306. This step is similar to the step S508 above.

Once the integrated application is deployed and downloaded by a user using a user device 300, the user may execute the integrated application 204 comprising an SDK 204A to perform one or more actions. For example, the integrated application 204 may be a banking application, and a user may wish to launch the banking application before conducting an online bank transfer using the banking application. The invocation of the integrated application 204 may cause the integrated application 204 and/or the SDK 204A in the integrated application 204 to perform an application integrity verification process. For example, in the case of where the integrated application 204 is a banking application, the SDK in the banking application can invoke an application integrity verification process so that the integrity of the banking application can be confirmed before any sensitive functions (e.g., viewing account balances or performing payments) are performed by the banking application.

In step S618, after the integrated application 204 has been invoked, the SDK 204A may determine an application checksum for the integrated application 204 and may obtain a unique identifier for the integrated application.

In step S619, the SDK 204A may transmit the application identifier 205B to the secure server computer 300 via any suitable communications network (e.g., a cellular network or the Internet). In step S619, the SDK 204A may also transmit the determined checksum (e.g., determined during runtime) to the secure server computer 300.

In step S620, after receiving the application identifier 205B for the integrated application, the secure server computer 300 may use the application identifier 205B to retrieve the original checksum of the integrated application 204 from the database 306. Once the original checksum is retrieved, the secure server computer 300 may transmit the original checksum to the SDK 204A. In addition, the secure server computer 300 may optionally sign the original checksum or other data using a private key associated with the secure server computer 300.

In step S622, the SDK 204A may receive the application original checksum from the secure server computer 300. The SDK 204A may also receive the above-described signed data from the secure server computer 300 and optionally a digital certificate with a public key corresponding to the private key used to create the signed data.

In step S624, the SDK 204A validates the checksum that was determined in step S618 by comparing it with the original checksum received from the secure server computer 300. In step S625, the SDK 204A then determines if the determined checksum and the original checksum are equal.

In step S627, if the two checksum values do not match, then the application integrity verification fails. The SDK 204A and/or the integrated application 204 may generate an error message for the user of the user device.

In step S630, if the two checksum values do match, then the SDK 204A can confirm the integrity of the integrated application 204 including the SDK 204A (i.e., confirm that the integrated application 204 has not been tampered with or altered since it was made available for distribution). Then, the signed data received from the secure server computer 300 is verified using a public key corresponding to the private key that signed the data.

In step S632, if the checksum values match and if the signed data has been verified, then the application integrity process is deemed a success.

In step S634, because the application integrity process was successfully completed, the integrated application can then be allowed to perform any appropriate action desired by the user of the user device.

The frequency in which the integrated application 204 performs an application integrity verification may depend on the SDK developer system 402. The SDK 204A may be coded by the SDK developer system 402 to perform application integrity verification whenever the integrated application 204 is launched, whenever the integrated application 204 is requested to perform a particular function (e.g., when the user wishes to make a payment using the integrated application 204).

In some embodiments, in addition (and/or alternatively) to the SDK comparing the checksums, the secure server computer 300 can compare the checksums. For example, in step S619, in addition to sending the unique application identifier, the SDK 204A can also send the determined checksum from step S618 to the secure server computer 300. The secure server computer 300 may retrieve the original checksum for the integrated application 204 by using the application identifier.

In step S626, the secure server computer 300 may compare the determined application checksum with the original checksum. If the checksums match, then the secure server computer 300 can be confident that the integrated application was not altered or tampered with.

In step S628, the secure server computer 300 may sign data such as the original checksum, the application identifier, and or a checksum comparison result with a private key associated with the secure server computer 300. This may serve as an attestation. The secure server computer 300 may then send the signed data along with a digital certificate including a public key corresponding to the private key to the SDK 204A.

In step S630, the signed data received from the secure server computer 300 is verified using a public key corresponding to the private key that signed the data.

In step S632, if the checksum values match and if the signed data has been verified, then the application integrity process is deemed a success.

In step S634, because the application integrity process was successfully completed, the integrated application can then be allowed to perform any appropriate action desired by the user of the user device.

Embodiments of the invention have a number of advantages. Using embodiments of the invention, the integrity of a later developed integrated application with an SDK can be verified by the SDK when the integrated application is used by an end user, even though the SDK developer was not involved with the development of the final integrated application. The developer of the SDK can then be assured that the functions performed by SDK will always be secure, and that the security will not be dependent upon how the integrated application developer creates the integrated application. This is particularly useful when the functions performed by the SDK are ones that involve the use or the passage or use of sensitive data.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   executing an integrated application comprising an SDK (software development kit) on a user device;
   determining, by the SDK and a processor on the user device, a checksum for the integrated application;
   validating, by the SDK in the user device, the integrated application using the determined checksum; and
   responsive to validating the determined checksum, performing, by the integrated application on the user device, an action,
   wherein the method further comprises:
   transmitting, by the user device, an application identifier for the integrated application to a remote server computer, and wherein validating the integrated application using the determined checksum comprises:

transmitting, by the user device, the determined checksum to the remote server computer, wherein the remote server computer compares the determined checksum and an original checksum to determine if the determined checksum and the original checksum match, and generates an indication of a match and transmits the indication to the user device; and
   receiving, by the user device the indication of the match.

2. The method of claim 1, wherein determining the checksum comprises using a hash function to determine the checksum.

3. The method of claim 1, wherein the action comprises obtaining access to secure information.

4. The method of claim 1, wherein the SDK performs authentication or security functions for the integrated application.

5. The method of claim 1, wherein the SDK is developed by an entity that is different than an entity that develops the integrated application.

6. The method of claim 1, wherein the method further comprises:
   receiving, by the SDK a device attestation from the remote server computer after determining that the determined checksum and the original checksum match, wherein the remote server computer is a secure server computer.

7. The method of claim 1,
   wherein the indication of the match is in the form of signed data which can be verified by the user device using a public key associated with a private key that created the signed data.

8. The method of claim 1, wherein the integrated application is a banking application.

9. The method of claim 1, wherein the SDK includes biometric authentication software.

10. The method of claim 1, wherein the integrated application is programmed to conduct a payment transaction.

11. A method comprising:
   executing an integrated application comprising an SDK (software development kit) on a user device;
   determining, by the SDK and a processor on the user device, a checksum for the integrated application;
   validating, by the SDK in the user device, the integrated application using the determined checksum; and
   responsive to validating the determined checksum, performing, by the integrated application on the user device, an action,
   wherein the method further comprises:
   transmitting, by the user device, an application identifier for the integrated application to a remote server computer, and wherein validating the integrated application using the determined checksum comprises:
   receiving an original checksum for the integrated application from the remote server computer; and
   comparing the determined checksum and the original checksum to determine if the determined checksum and the original checksum match.

12. The method of claim 11, wherein the integrated application is a banking application.

13. The method of claim 11, wherein the SDK includes biometric authentication software.

14. The method of claim 11, wherein the integrated application is programmed to conduct a payment transaction.

15. A user device comprising:
   a processor; and a computer readable medium, comprising code for executing operations including:

executing an integrated application comprising an SDK (software development kit) on the user device;

determining, by the SDK and the processor on the user device, a checksum for the integrated application;

validating, by the SDK in the user device, the integrated application using the determined checksum; and responsive to validating the determined checksum, performing, by the integrated application on the user device, an action, wherein the operations further comprise:

transmitting an application identifier for the integrated application to a remote server computer, and wherein validating the integrated application using the determined checksum comprises:

receiving an original checksum for the integrated application from the remote server computer; and comparing the determined checksum and the original checksum to determine if the determined checksum and the original checksum match.

16. The user device of claim 15, wherein the user device is a mobile phone.

17. The user device of claim 15, wherein the application identifier is stored on the user device.

18. The user device of claim 15, wherein the integrated application is a banking application.

19. The user device of claim 18, wherein the SDK includes biometric authentication software.

\* \* \* \* \*